H. G. HILLMAN.
ELEVATOR.
APPLICATION FILED DEC. 22, 1909.

1,045,844.

Patented Dec. 3, 1912.
6 SHEETS—SHEET 2.

H. G. HILLMAN.
ELEVATOR.
APPLICATION FILED DEC. 22, 1909.

1,045,844.

Patented Dec. 3, 1912.
6 SHEETS—SHEET 3.

Witnesses:
W. A. Hutton
John O. Gempler

Henry G. Hillman,
Inventor,
By his Attorneys,
Kenyon & Kenyon.

H. G. HILLMAN.
ELEVATOR.
APPLICATION FILED DEC. 22, 1909.

1,045,844.

Patented Dec. 3, 1912.
6 SHEETS—SHEET 4.

H. G. HILLMAN.
ELEVATOR.
APPLICATION FILED DEC. 22, 1909.

1,045,844.

Patented Dec. 3, 1912.
6 SHEETS—SHEET 6.

UNITED STATES PATENT OFFICE.

HENRY G. HILLMAN, OF MORRIS PARK, NEW YORK, ASSIGNOR TO JOHN T. CLARKE, OF NEW YORK, N. Y.

ELEVATOR.

1,045,844.  Specification of Letters Patent.  Patented Dec. 3, 1912.

Application filed December 22, 1909. Serial No. 534,425.

*To all whom it may concern:*

Be it known that I, HENRY G. HILLMAN, a citizen of the United States, and a resident of Morris Park, Queens county, Long Island, State of New York, have invented new and useful Improvements in Elevators, of which the following is a specification.

My invention relates to elevators and more particularly to automatic safety appliances therefor.

One of the objects of my invention is to provide means whereby the elevator car cannot move away from any landing due to the careless or accidental operation of the operator's controller as long as the door at that landing remains open, and whereby in the case of a hydraulic elevator should the car start from a landing due to leakage while the controller is at its off or neutral position the car will be automatically returned to the landing and will be prevented from moving but a short distance therefrom before such return movement.

Another object of my invention is to provide means for automatically latching the door at any landing and for holding the door latched until the car arrives in its proper position at the landing and the controller handle moved to the off or neutral position, said means including a novel arrangement of circuits for controlling the latches.

My invention is especially useful in cases where the operator is frequently obliged to leave his car, as where a watchman inspecting a building leaves his car standing at each landing while he makes his rounds, during which time the car either due to some movement of the controller handle or due to leakage may move away from the landing. In such cases with my invention it is impossible for the car to leave the vicinity of the landing.

Other objects of my invention will more fully appear from the following specification taken in connection with the accompanying drawings in which—

Figure 1:
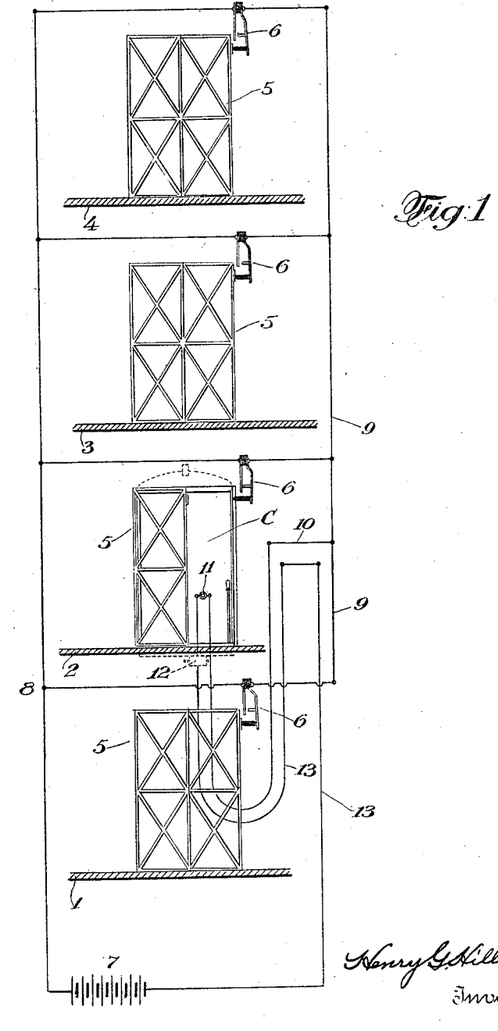
Figure 1 shows diagrammatically a car at one of a plurality of landings, the same being equipped with one feature of my invention.

Referring to the drawings, Fig. 1; 1, 2, 3 and 4 are landings in the path of travel of the car each of which is provided with a door 5 which controls a contact 6 which is held open when its door is closed but is permitted to be closed as soon as its door is opened. The contacts 6 are placed in multiple across a source of power 7, the circuits from the contacts being as follows: from battery 7 through wire 8 through the cross wires and respective contacts in multiple to wire 9, thence through wire 10, cut-out 11, located in the car at landing 2, automatic safety appliance 12 and wire 13 back to the battery. As hereinafter explained, the automatic safety device 12 will be energized whenever any of the contacts 6 are closed, the energization of which will prevent the car from leaving the vicinity of the landing.

Figure 2:
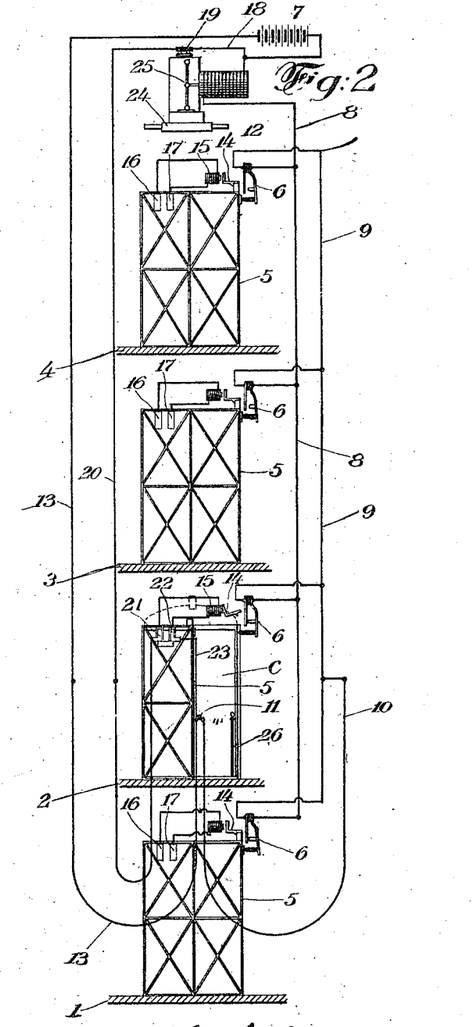
Fig. 2 is a modification of the same showing additional features of the invention used in connection therewith.

In Fig. 2 the automatic safety appliance is shown as located at the top of the elevator well and each of the doors 5 is shown as equipped with an automatic latch 14 in addition to the contacts 6 which latch can only be operated by the energization of a magnet 15 which is energized when the car reaches its proper position at the landing. The circuit shown in Fig. 2 for controlling the automatic safety appliance is as follows: from battery 7, through the actuating magnet of the safety appliance 12, wire 8, through the contacts 6 at each landing in multiple to wire 9 thence through wire 10, cut-out 11 in the car at landing 2 and wire 13 back to the battery. The circuit controlling the door latches may be traced as follows: from battery 7, through wire 18, contact 19 controlled by the automatic safety appliance, wire 20, movable contact 21 and stationary contact 16 at landing 2, through magnet 15 to a movable contact 22 and stationary contact 17 thence through wire 23 and wire 13 back to the battery.

It will be seen from the above traced circuits that the automatic safety appliance for preventing the car from moving away from the landing will be energized when any of the contacts 6 are closed by the opening of a door at any landing, and also that none of the doors can be opened except by the energization of its magnet 15 due to the contacts 21, 22 carried by the car registering with the stationary contacts 16, 17 at each landing. As hereinafter explained, part of the automatic safety appliance is movable with the controller handle and the contact 19 in the circuit of the door latch magnets is so arranged upon this movable part that said circuit cannot be closed unless the controller is in its off or neutral position.

Figure 3:
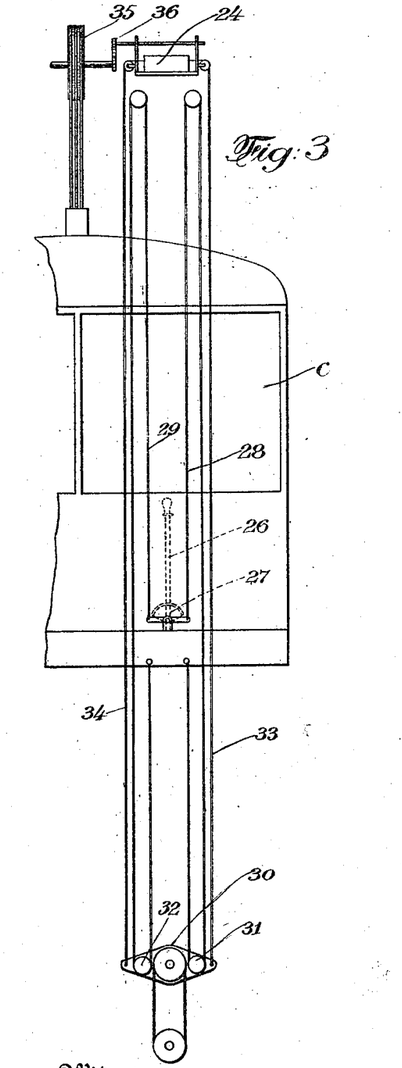
Fig. 3 shows one arrangement for applying my invention to the car.
Figure 4:
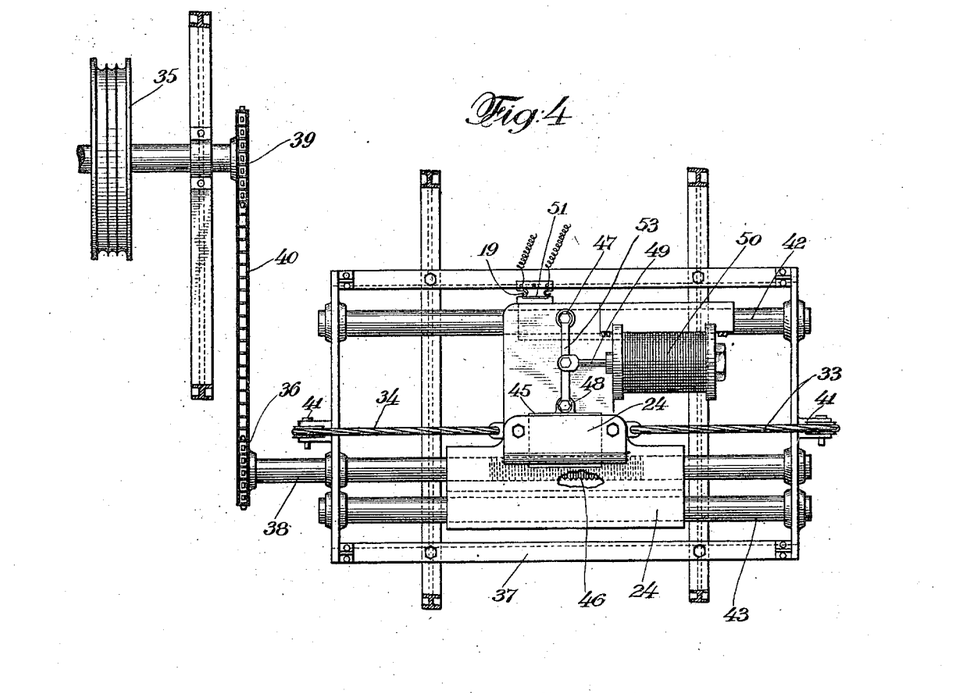
Fig. 4 is a plan view of a part of the automatic controlling apparatus shown diagrammatically in Fig. 3.
Figure 5:
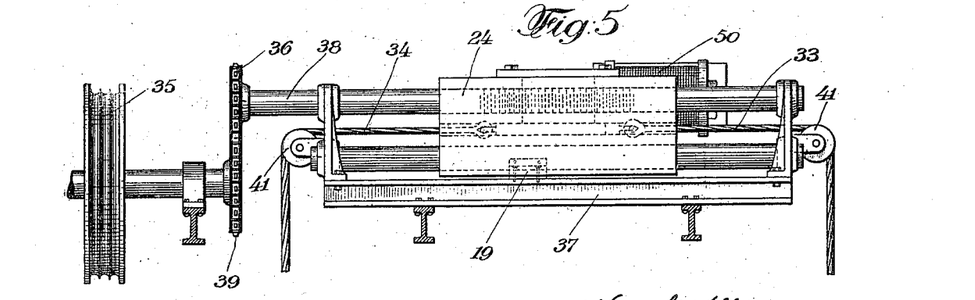
Fig. 5 is a side elevation of the apparatus shown in Fig. 4.

In Fig. 3 I have shown one arrangement of connecting the automatic safety appliance with the controller handle. The automatic safety appliance is shown in this modification as mounted at the top of the elevator well and as being geared to a part of the motive mechanism 35 by means of gears 36, while the movable part of said safety appliance is connected by suitable cables 33, 34 to a rock arm 30 secured, as shown, at the bottom of the well and upon which is mounted two sheaves 31, 32, over which pass cables 28, 29 connected at one end to the car and at their other ends to the controller handle 26 by means of the bar 27. By this arrangement of the cables, whenever the part 24 of the automatic safety appliance is moved it will cause the arm 30 to rock from its horizontal position thus throwing the controller handle in one position or the other according to the direction of movement of the part 24.

Figure 6:
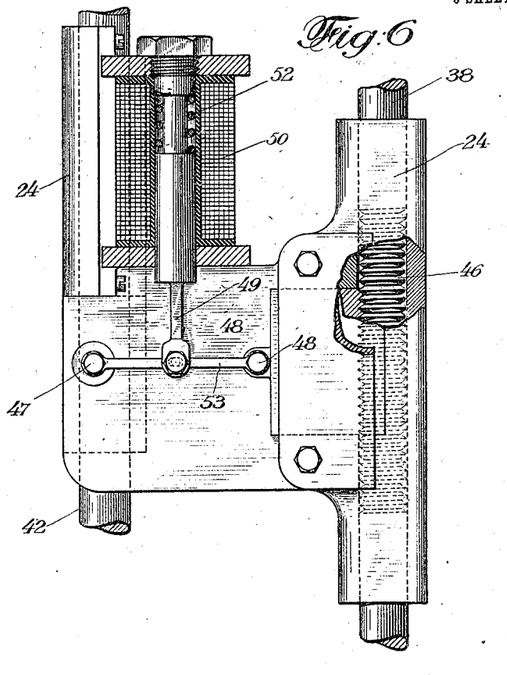
Figs. 6 and 7 are respectively enlarged plan and end views of parts of the apparatus shown in Fig. 4.
Figure 7:
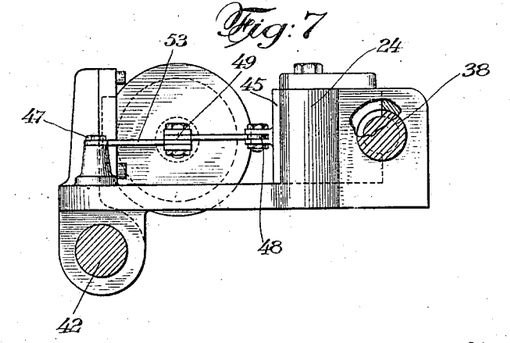

The construction of one form of the automatic safety appliance is shown in Figs. 4, 5, 6 and 7 in which 37 is a frame mounted at the top of the elevator well on which is journaled a threaded shaft 38 which is geared to a suitable part of the motive mechanism 35 by means of the wheels 36, 39 and chain 40. Mounted at each end of the frame are sheaves 41, 41 over which pass the cables 33, 34 which are connected to the movable part 24 of the safety appliance, which part is arranged to slide longitudinally upon cross rods 42 and 43. Upon the movable part 24 is mounted a threaded member 45 in the form of a half nut for engaging the threads 46 upon the shaft 38. The threaded member 45 is arranged to be moved back and forth, toward and away from, the threaded shaft by means of a toggle 53, which is pivoted at 47 to the frame 24, and at 48 to the threaded half nut 45. The rod 49 as shown in Fig. 6, is provided with a spring 52 which normally holds the half nut 45 away from the threaded shaft. This toggle is thrown by means of rod 49 connected thereto through a slot connection and actuated by electro-magnet 50 mounted upon the movable member 24 to thrown the toggle for causing the engagement of said threaded members when the magnet 50 is energized due to the opening of any one of the doors. Mounted upon the frame 37 are contacts 51 which are arranged to be engaged by the contact 19 carried by movable member 24 only when the controller is in its off or neutral position, which contacts as hereinafter mentioned are included in the circuit to the door latch magnets 15 so that no door can be unlatched except when the controller handle is at the off position and the car in its proper position at the landing.

With the apparatus thus far described and shown in Figs. 2, 3, 4, 5, 6 and 7, assuming that the car is at landing 2, as shown in Fig. 2, with the door open, magnet 50 will be energized through the circuit previously traced to throw the toggle 53 against the force of spring 52 causing the engagement of the threaded members 38 and 45 thus locking the movable member 24 and the controller handle connected thereto with the threaded shaft 38 so that it will be impossible to move the controller handle from its off or neutral position. If while the parts are in the position shown in Fig. 2, the car should start off due to leakage of its valves, the threaded member 38 will be driven from the motive power mechanism to which it is geared, in a direction to cause the movable member 24 and the rest of the controller mechanism connected thereto to be moved in a direction to return the car to the landing, and should the leakage keep up the controller handle will be automatically moved back and forth, thus keeping the car in the vicinity of the landing.

While I have shown the automatic safety appliance with the form of invention thus far described, as located at the top of the elevator well and as being driven from a part of the motive power by means of a chain and sprocket wheels, it is obvious that the automatic safety appliance may be located at any suitable point and may be operated in any manner desired from any suitable part of the motive mechanism.

Figure 8:
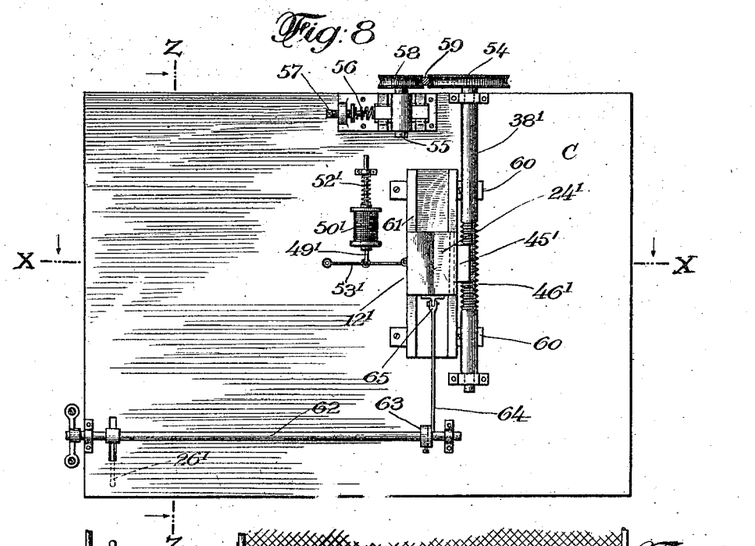
Fig. 8 is a plan view looking up from beneath the car of a modification of the apparatus shown in Fig. 4.
Figure 9:
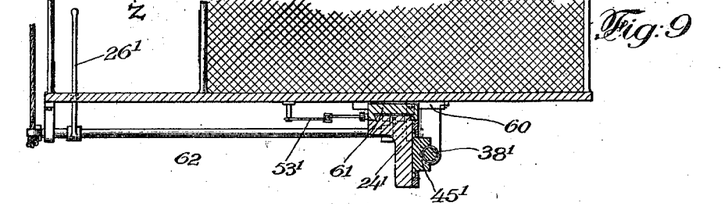
Fig. 9 is a sectional view of the same taken on line X X.
Figure 10:
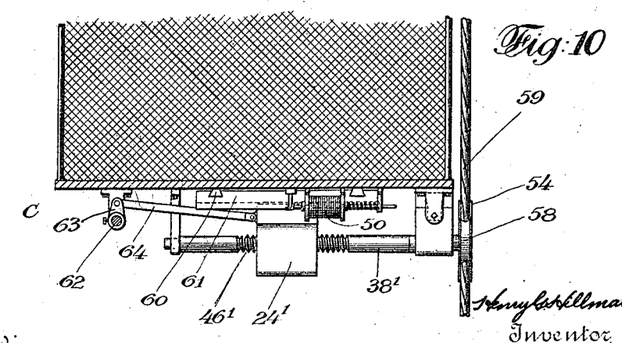
Fig. 10 is a view of the same taken on line Z Z.

In Figs. 8, 9 and 10 I have shown the automatic safety appliance as secured beneath the floor of the car and differing in some respects from the construction previously shown and described. Mounted beneath the floor of the car C is a shaft 38' having threads 46', and upon this shaft is secured a grooved wheel 54. Beneath the floor and adjacent to the shaft 38' is also mounted a stub-shaft 55, mounted for movement toward and away from shaft 38' and thrust toward the shaft by a spring 56, the pressure of which upon the shaft 55 may be adjusted by means of a screw 57. A grooved wheel 58 is mounted upon the stub-shaft 55 and is held with sufficient pressure upon a stationary cable 59 to cause the rotation of wheel 54 when the car is in motion. A track-way 60 is secured beneath the floor of the car upon which is arranged a member 61, preferably having a dove-tailed connection with the trackway and having a groove on its lower side in which moves a dove-tailed projection from the movable part 24' of the controller mechanism. A half-nut 45' is secured to the movable member 24' and is provided with threads for engaging the threads 46' on the shaft 38'. The grooved member 61 carrying the movable member 24' and half-nut 45' is arranged to be moved back and forth toward and away from the threads on shaft 38' by means of a toggle 53' operated through rod 49' by means of a magnet 50' which is controlled as heretofore explained in connection with the previously described apparatus. The toggle in this case as in the former is held broken by means of a spring 52', and the toggle is straightened whenever one of the doors are opened and the magnet 50' energized, for the purpose of causing the engagement of the threaded members, as heretofore explained. The part 24' carrying the half-nut 45' is arranged to travel back and forth in the groove of member 61 whenever the half nut engages the threads 46'; and the controller handle 26' is operated from this movable member 24' through the rock shaft 62, crank 63 and rod 64 pivoted to the movable member 24' at 65. It will be observed that with this construction of the automatic safety appliance the toggle moves the grooved member 61 which carries the member 24' to which the half nut 45' is rigidly secured, and the member 24' is movable relative to the member 61 when the threaded members are in engagement; whereas in the form shown in Figs. 4, 5, 6 and 7, the toggle operates directly upon the half-nut 45, the toggle and magnet being mounted directly upon the member 24' and movable therewith, when the threaded members are brought into engagement.

The operation of the apparatus shown in Figs. 8, 9 and 10 is as follows: When the car is standing at the landing with a door open magnet 50' is energized thus straightening the toggle and causing engagement of the threaded members for locking the controller handle 26' against movement. Should the car start away from the landing due to leakage in the valves, the shaft 38' will be rotating in a direction to move member 24' so as to throw the controller in a direction to return the car to the landing as previously described in connection with the form shown in Fig. 4. It will be understood that in this form as in the form shown in Fig. 4, the threaded shaft will be put into motion as soon as the car starts from the landing, since shaft 38' is driven by the relative motion of the car with respect to stationary cable 59.

Figure 11:
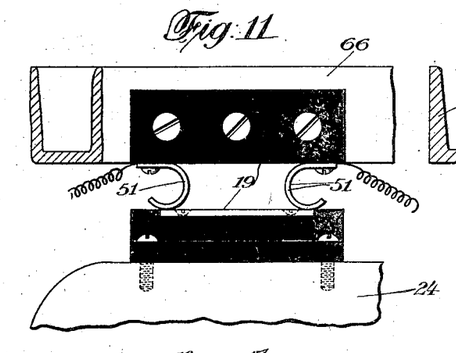
Figs. 11, 12, 13 and 14 are details of parts of the apparatus shown in Fig. 2.
Figure 12:
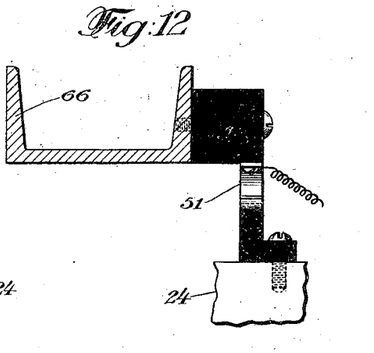

Figs. 11 and 12 show enlarged views of contact 19 carried by the movable member 24 and the contacts 51 mounted adjacent thereto. The circuit to the door latch magnets passes through these contacts as previously described so that it would be impossible to energize any of the magnets for the purpose of unlatching a door unless the controller handle is at its off or neutral position, in which position the contacts 51 engage the contact 19.

By arranging the conductors 13 and 20 for energizing the door latch magnets 15, with the cables leading to the car, I do away with the necessity of having to run these conductors along the elevator well or other part of the building. This arrangement adds greatly to the economy both of installing and maintaining such apparatus as compared with the old manner of wiring these conductors to the wall of the elevator well and having a contact piece carried by the car to close the circuit when the car reaches a landing. When current is already supplied to the car, as for lighting purposes, it is only necessary for the purpose of operating the door latch magnets to tap off from the lighting or other cables to the movable contacts 21, 22, and where, as shown in Fig. 2, the conductor 13 is carried to the car for the purpose of controlling the other safety appliance, it is only necessary to add one additional conductor 20, and even in cases where it is necessary to run two separate conductors to the car for the purpose of energizing the door latch magnets, they can be secured to the cable leading to the car with much less expense than would be required in wiring them to the wall of the well, and when arranged in the form of a cable passing to the car they are much more accessible for the purpose of repairs than when they are secured to the wall of the elevator well.

Figure 13:
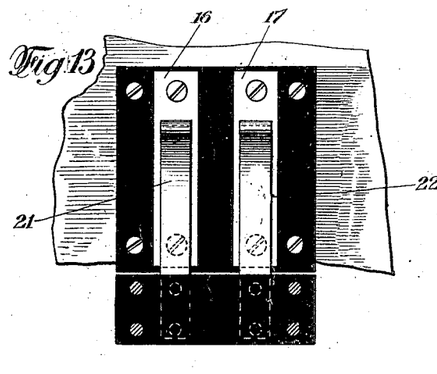
Figure 14:
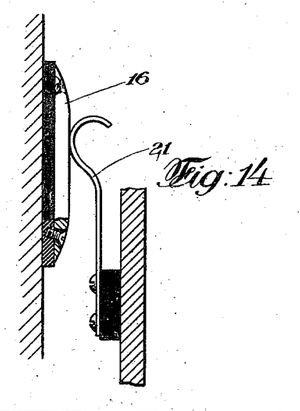

Figs. 13 and 14 are enlarged views of the stationary contacts 16, 17 mounted at a suitable point near the landing and in the path of travel of the car so that they may be engaged by the movable contacts 21, 22 mounted at a suitable point on the car. The stationary contacts are mounted in such a position that they will only be engaged by the movable contacts when the car is in its proper position at the landing.

Figure 15:
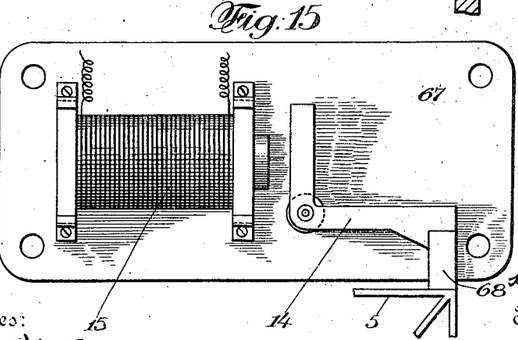
Fig. 15 shows one modification of a door latch.

In Fig. 15 the door latch 14 and operating magnet 15 are shown as mounted on a plate 67 which may be secured at any suitable point near the door. The latch in this case is shown as engaging a projection 68 carried by the door 5.

It will be seen from the above description of my invention that I have provided means for returning the car to the landing should it improperly move away from the same, which means is so arranged as to be controlled or driven from the car power mechanism so as to move simultaneously and in unison with the car and at a speed proportionate to the travel of the car, which arrangement provides a simple, gradual, positive and accurate control of the car for returning it to the landing and for keeping it in the vicinity of the landing during the leakage of the car valves. While I have shown and described with particularity the apparatus which seems at present to be the best embodiment of my invention, due to its simplicity and accuracy of operation, yet I do not wish to be understood as limiting myself to any particular arrangement or construction of the controlling mechanism shown, other than as indicated in the appended claims, since it is obvious to those skilled in the art that many changes in the arrangement and construction may be made without departing from the spirit of my invention.

Having thus described my invention what I claim and desire to secure by Letters Patent of the United States is—

1. The combination of an elevator car, power mechanism therefor, a door, an operator's controller for governing the application of power to said car, and means including a member connected to the controller and a threaded shaft coöperating therewith and mechanically driven by the movements of the car for moving the controller in opposite directions determined by the travel of the car and controlled by the door and rendered effective whenever the same is open for preventing the operation of the controller by the operator.

2. The combination of an elevator car, power mechanism therefor, a landing and a door at said landing, a circuit controlled by said door, an operator's controller for governing the application of power to said car, means including a threaded shaft coöperating with the controller mechanism for governing the controller and driven at a speed proportional to the speed of the car, and means controlled through said circuit and operated in response to the opening of the door for effecting the movement of the controller by said first means when the car is moved and in a direction to return the car to the landing.

3. The combination of an elevator car, power mechanism therefor, a landing and a door at said landing, a circuit controlled thereby, an operator's controller for governing the application of power to said car, means including a threaded shaft for moving the controller in a direction determined by the direction of travel of the car and at a speed proportional to the speed of the car and operated whenever the car is traveling, means including a half nut for connecting said controller and threaded shaft, and means operated through said circuit and controlled by the door for causing said controller operating and connecting means to move the controller in a direction to return the car to the landing whenever it moves away with the door open.

4. The combination of an elevator car, power mechanism therefor, a landing and a door at said landing, a circuit controlled by said door, an operator's controller for governing the application of power to said car, means including a threaded shaft for actuating the controller when the door is open and the car in motion and operated simultaneously with the car as it starts from the landing and in a direction determined by the direction of travel of the car, and means controlled through said circuit when the door is open and the car in motion for causing said controller actuating means to move the controller in a direction to return the car to the landing.

5. The combination of an elevator car, power mechanism therefor, a landing and a door at said landing, a circuit controlled by said door, an operator's controller mechanism for governing the application of power to the car, a threaded shaft operated simultaneously with the car as it starts from the landing and at a speed proportional to the speed of the car, a clutch member connected to the controller mechanism for engaging said threaded shaft, and electro-magnetic means carried by the controller mechanism and controlled by said door and operated through said circuit when the door is opened for connecting the clutch member with the threaded shaft for preventing movement of the controller mechanism by the operator.

6. The combination of an elevator car, power mechanism moving the car, controller mechanism for governing the application of power to the car, a landing and a circuit controlled from said landing, means including a threaded shaft and also a half nut carried by the controller mechanism for operating said controller mechanism, said shaft being mechanically driven in response to movement of some part of said power mechanism and in a direction determined by the direction of travel of the car, and electro-magnetic means controlled through said circuit from the landing to cause said controller operating means when the door is open and the car in motion, to move the controller in a direction to return the car to the landing.

7. The combination of an elevator car, power mechanism therefor, an operator's controller mechanism, a clutch comprising a rotatable threaded member driven from some part of said power mechanism to rotate in a direction determined by the direction of travel of the car, and a second member connected to the controller mechanism and arranged to engage the threads of said rotatable member, and electromagnetically operated means for moving said second member into engagement with said threads for connecting the controller mechanism to said threaded member.

8. The combination of an elevator car, power mechanism therefor, an operator's controller, a threaded member driven from said power mechanism, a carriage connected to the controller and movable longitudinally of the threaded member, a half nut movably mounted on the carriage and having threads for engaging the threaded member, and electromagnetically controlled means also mounted on the carriage for throwing the half nut into engagement with the threaded member to cause the carriage and controller to be moved thereby.

9. The combination of an elevator car, power mechanism therefor, an operator's controller mechanism, a threaded member mechanically connected to and driven from some part of said power mechanism and operated simultaneously with the car when the latter is started, means connected with the controller mechanism and coöperatively related to the threaded member to be moved thereby in a direction determined by the direction of travel of the car, and means for causing engagement between said first means and said threaded member for moving the controller in a direction to reverse the car movement.

10. The combination of an elevator car, power mechanism therefor, an operator's controller mechanism, a clutch comprising a rotatable threaded member driven from some part of said power mechanism to rotate in a direction determined by the direction of travel of the car, and a second member connected to the controller mechanism and arranged to engage the threads of said rotatable member, a toggle for moving said second member into engagement with said threads, and means for operating said toggle for connecting the controller mechanism with said threaded member.

11. The combination of an elevator car, power mechanism therefor, an operator's controller, a clutch comprising a rotatable threaded member driven by the travel of the car and in a direction determined by the direction of travel of the car, and a second clutch member connected with said controller and movable therewith relative to the threaded member, a toggle, and a magnet for operating the same movable with said second clutch member for causing the engagement of said clutch members for moving the controller.

12. The combination of an elevator car, power mechanism for moving the car, an operator's controller, a plurality of landings for said car and a door at each landing, a circuit having contacts controlled by each of said doors, a threaded member mechanically connected to and driven from some part of said power mechanism in a direction determined by the direction of travel of the car, means connected with the controller mechanism and coöperatively related to the threaded member to be moved thereby, and electromagnetic means controlled through said circuit and operated when a door is opened for causing the engagement of said controller connected means and threaded member.

13. The combination of an elevator car, power mechanism therefor, an operator's controller, a clutch comprising a rotatable shaft provided with threads and driven from the power mechanism in a direction determined by the direction of travel of the car, and a threaded half nut connected to the controller and movable longitudinally of the threaded member, and a toggle for moving said half nut into engagement with said threaded member for causing the controller to be operated by said shaft.

14. The combination of an elevator car, power mechanism therefor, an operator's controller, a threaded member located in the vicinity of the power mechanism and driven therefrom, a carriage connected to the controller and movable longitudinally of the threaded member, a half nut mounted on the carriage for engaging the threaded member, and a toggle for moving the half nut into engagement with the threaded member for causing the carriage and controller to be moved thereby.

15. The combination of an elevator car, power mechanism therefor, an operator's controller, a threaded member located in the vicinity of the power mechanism and driven therefrom, a carriage connected to the controller and movable longitudinally of the threaded member, a half nut movably mounted on the carriage for engaging the threaded member, and a toggle for moving the half nut into engagement with the threaded member for causing the carriage and controller to be moved thereby.

16. The combination of an elevator car, power mechanism therefor, an operator's controller, a threaded member driven from said power mechanism, a carriage connected to the controller and movable longitudinally of the threaded member, a half nut movably mounted on the carriage and having threads for engaging the threaded member, a toggle pivoted at one end to the carriage and at the other end to the nut, and electromagnetic means for throwing the toggle to engage said half nut with the threaded member for causing the carriage and controller to be moved thereby.

17. The combination of an elevator car, means for driving the same, an operator's controller, a frame mounted in the vicinity of said driving means, a shaft mounted on said frame operated from said driving means and having threads thereon, a carriage connected to the controller and mounted on said frame to move longitudinally of the threaded member, means on the carriage for engaging said threaded member, and means for moving said engaging means into engagement with the threaded member for causing the carriage and controller to be moved thereby.

18. The combination of an elevator car, power mechanism therefor, a landing and a door at said landing having an electromagnetically controlled latch and a circuit controlling the same, an operator's controller, a frame mounted in the vicinity of said power mechanism, a threaded shaft mounted on said frame and driven from said power mechanism, a carriage connected to the controller and also mounted on said frame and movable longitudinally of said shaft, a threaded half nut movably mounted on said carriage, means mounted upon said carriage for moving the half nut into engagement with the threaded member for causing the carriage and controller to be operated thereby, and contacts in said circuit controlled by the carriage to close said circuit when the controller is in its neutral or off position.

19. The combination of an elevator car, a landing, a door at said landing and a latch for said door, electromagnetic means for operating said latch, a source of energy for said means, and a circuit for energizing said means comprising a contact in the path of travel of the car, a contact movable with the car for engaging said first contact and a connection from said source to the contact on the car.

20. The combination of an elevator car, a landing, a door at said landing and a latch for said door, electromagnetic means at the landing for operating said latch, a source of energy for said electro-magnetic means, a contact at the landing in the path of travel of the car connected with said means, a contact on the car for engaging said first contact, and connections between said source and the contact on the car.

21. The combination of an elevator car, power mechanism therefor, an operator's controller, means driven from said power mechanism and connected to the controller to move the same, a landing and a door at said landing, a latch for said door, electromagnetic means for operating said latch, a source of energy for said electro-magnetic means, and a circuit for controlling said means including a stationary contact, a contact on the car for engaging the same, a connection from the source to the contact on the car, and a contact in said connection closed by said controller-connected means for preventing the energization of the circuit to unlatch the door until the controller is in its off position.

In testimony whereof, I have signed my name to this specification, in the presence of two subscribing witnesses.

HENRY G. HILLMAN.

Witnesses:
JOHN T. CLARKE,
SAMUEL M. WARD, Jr.